United States Patent [19]

Hasquenoph, deceased et al.

[11] Patent Number: 4,632,338

[45] Date of Patent: Dec. 30, 1986

[54] UNDER AIRCRAFT LOAD CARRYING AND RELEASE DEVICE WITH TRIPLE ROLLER ESCAPEMENT

[75] Inventors: Jean Hasquenoph, deceased, late of Lagny sur Marne, by Simone Hasquenoph, legal representative; Pierre F. Coutin, Paris, both of France

[73] Assignee: R. Alkan & Cie, France

[21] Appl. No.: 675,039

[22] Filed: Nov. 26, 1984

[30] Foreign Application Priority Data

Nov. 29, 1983 [FR] France .................................. 83 19041

[51] Int. Cl.⁴ .............................................. B64C 1/22
[52] U.S. Cl. .............................. 244/137 A; 294/82.26
[58] Field of Search .............. 244/137 R; 298/82.26; 89/1.3, 1.34, 1.53, 1.51; 292/201, 26, 27, 48

[56] References Cited

U.S. PATENT DOCUMENTS

| | | | |
|---|---|---|---|
| 3,610,094 | 4/1969 | Craigie | 244/137 A |
| 4,050,656 | 9/1977 | Peterson | 89/1.53 |
| 4,202,576 | 5/1980 | Hasquenoph et al. | 244/137 A |
| 4,313,582 | 2/1982 | Hasquenoph et al. | 244/137 A |
| 4,524,670 | 6/1985 | Billard et al. | 89/1.53 |

FOREIGN PATENT DOCUMENTS

1450961 of 1966 France .......................... 244/137 A

*Primary Examiner*—Galen L. Barefoot
*Assistant Examiner*—Mark R. Valliere
*Attorney, Agent, or Firm*—William A. Drucker

[57] ABSTRACT

The invention provides an under aircraft load carrying and release device with possibility of orientation of the load with respect to the aircraft by using an eccentric and of fixing on fixed supports by raising the hooks. The device comprises a mechanism with three roller escapements, one for each hook and a third one for releasing a tripping spring, the rollers and the loaded articulations being mounted on ball or needle bearings and thus allowing heavy loads to be released by means of an electromagnet of small volume and low consumption.

8 Claims, 5 Drawing Figures

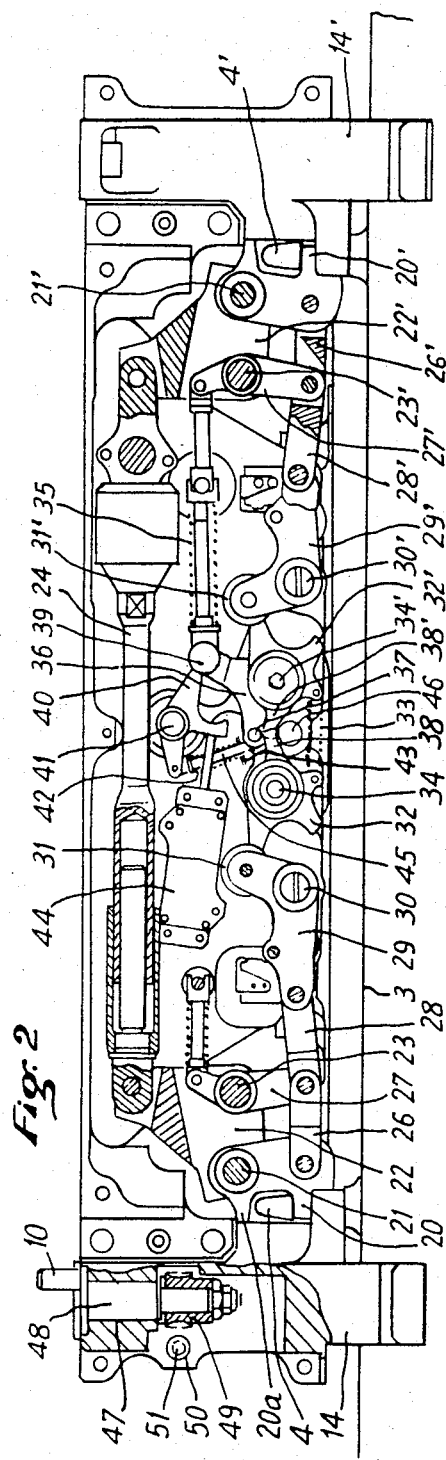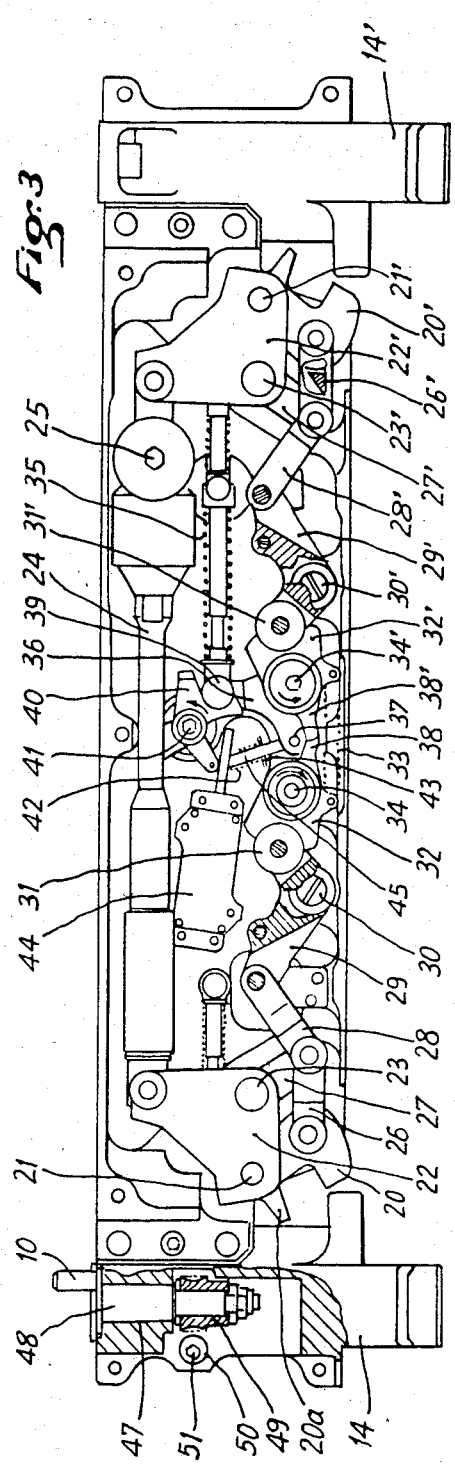

UNDER AIRCRAFT LOAD CARRYING AND RELEASE DEVICE WITH TRIPLE ROLLER ESCAPEMENT

BACKGROUND OF THE INVENTION

Numerous under aircraft and load carrying and release devices are known offering different characteristics depending on the use thereof and the performances required by the users.

SUMMARY OF THE INVENTION

In all cases it is interesting to imagine devices formed from a minimum of different parts while allowing rapid use thereof. For this, the device of the present invention comprises the advantages of a single centralized control for fixing the load, the possibility of fastening the two rings of the load, independently, which facilitates positioning thereof, the possibility of orientating the load (azimuth harmonization) and possible access from both sides of the load to the following manual controls:

azimuth harmonization;
resetting of the trip device;
clipping on;
centralized control for fixing;
manual trip; and
fitting of a safety pin.

On the other hand, the force step down mechanisms corresponding to each of the two hooks are strictly identical, the symmetrical arrangement thereof being obtained by simply reversing the parts, which simplifies construction and maintenance of the device. Each of these mechanisms comprises only a single swivel joint, which has been obtained by using roller clip on devices and ball or needle bearings for the loaded joints.

The invention further provides an intermediate base plate fixed to the aircraft with respect to which the carrying device may be orientated and to which it is secured. Azimuth harmonization, which is often necessary, may then be achieved with simple means as will be described further on.

BRIEF DESCRIPTION OF THE DRAWINGS

FIG. 2 is a longitudinal section of the fastening and tripping device, the load with two rings being positioned and the hooks being closed;

FIG. 3 shows the same section as FIG. 2, but in the release position, the hooks being open;

In FIG. 1 there is shown schematically at 1 an intermediate base plate fixed to the aircraft, for example by screw 6, passing through holes in the base plate and 2 a carrying device for a load 3 equipped with its two standard rings 4 and 4'. At both ends of the carrying device 2, blocks 14 and 14' have been provided which serve as supports for the load 3, when this latter is in position. These blocks have screws 11 and 12 passing therethrough for fixing the carrying device 2 to the base plate 1, which comprises the corresponding nut 7 floating in oblong recesses 13.

Figure 1:
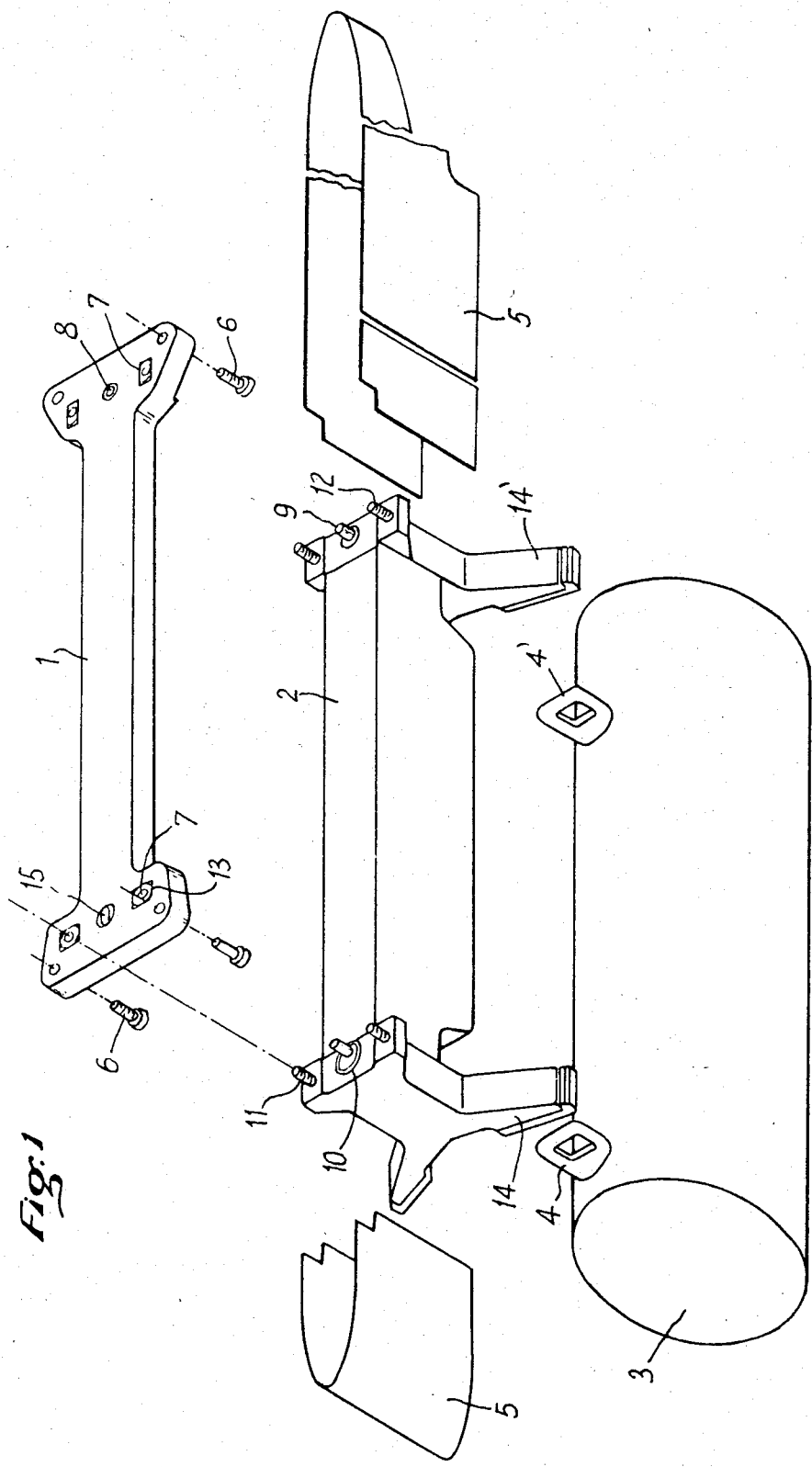
FIG. 1 shows schematically the assembly shown in perspective formed by the carrying device properly speaking and by the intermediate base plate fixed under the aircraft.

Orientation of the carrying device 2 and consequently that of load 3 with respect to the aircraft is obtained by means of the rotational pin 9, fixed to block 14' and pivoting in the corresponding hole 8 provided in base plate 1. This orientation is adjusted by means of an eccentric 10, operated from block 14. This eccentric finds its lateral support in the oblong hole 15, provided in base plate 1. When the correct orientation has been obtained, screws 11 and 12 are finally tightened. The assembly may be completed by appropriate streamlining 5.

In FIG. 2 are shown at 20 and 20' the hooks engaging respectively in rings 4-4' of load 3 and pivoting at 21 and 21' on brackets 22 and 22', which pivot on fixed pins 23 and 23' and are linked together by a screw tensioner 24. Adjustment of this tensioner is provided by means of a hexagonal nut 25 (FIG. 3) for example, on one side and/or on the other of the device as described in French Pat. No. 77.39818 (2413267) belonging to the same firm. This tensioner plays a double role. On the one hand, it is equivalent to a compensation bar equally distributing the forces on each of the two hooks and, on the other hand, it allows hooks 20 and 20' to be lowered or raised by extension or retraction thereof.

With the hooks brought previously into a low position, the load, once hooked on, may be applied against the fixed supports 14 and 14' which act as bearing means by complementary raising of the hooks resulting from a vertical translational movement of these hooks caused by retraction of the tensioner 24.

A more or less energetic force applied to the centralized control 25 allows the assembly to be prestressed as a function of the aerodynamic or inertial forces which the device is likely to undergo in use. At 26, 26' and 27, 27' have been shown the links ensuring the stability of hooks 20 and 20' and at 28, 28' and 29, 29' the elements forming the force step down swivel joints. At 30 and 30' have been shown the pivots about which parts 29 and 29' may pivot which support engagement rollers 31 and 31'. These parts may be actuated manually from both sides of the device for obtaining engagement in the absence of a load or for improving engagement if need be by means of the screwdriver slits down at the ends of pivots 30 and 30'.

At 32 and 32' have been shown the engagement and unlocking cams urged to the position shown by a common spring 33. Rotation of these cams in the direction of the arrows of FIG. 3 about pins 34 and 34' cause escapement of rollers 31 and 31'. This rotation is caused by the release of an energetic spring 35 acting on the lever 36 which is hinged to pin 34' and whose end 37 acts simultaneously on the arms 38 and 38' of cams 32 and 32'. This spring is itself held in the retracted position by a roller 39, bearing on a lever 40 pivoting at 41 and held in position by a spring under compression 42, bearing against a stop 43. The rotation of this lever 40 in the direction of the arrow of FIG. 3 is obtained either manually for causing the load to be left on the ground by an action on the hexagonal nut shown 41 or on that situated at the other side of the device, or by the action of an electromagnet 44 acting in the direction of the arrow on lever 40.

Rod 45 guiding spring 42 passes through the stud 43 and is extended as far as the edge of the hole 46 through which passes a safety pin. This arrangement is such that the safety pin, introduced from one side or the other of the device, prevents simultaneously any movement in the unlocking direction of the two cams 32 and 32', as well as rotation of lever 40 which immobilizes spring 35 and the electromagnet 44, even if this latter is accidently switched on.

It will be noted that a large number of parts 20 and 20', 21 and 21', 22 and 22', 23 and 23', 26 and 26', 27 and 27', 28 and 28', 29 and 29', 30 and 30', 31 and 31', 32 and 32' are systematically identical, the symmetry of the mechanisms relative to each of the hooks being obtained by simple reversal thereof, which limits the number of different parts.

It will be also noted that the step down mechanisms are limited to a single swivel joint per hook and that this simplicity is due to the systematic use of roller engagement and escapement devices, as well to the ball or needle bearing mounting of the loaded articulations.

These high efficiency assemblies allow large loads to be released by the action of an electromagnet 44 taking up little space and consuming little power;

In block 14 there has been shown at 47 a bore in which the cylindrical part 48 may be oriented, comprising at its upper end the eccentric 10 intended to bear on the base plate 1 through the oblong hole 15 of FIG. 1, in order to obtain the desired orientation of the carrying device 2. At 49 has been shown a toothed wheel integral with the cylindrical part 48. To this wheel corresponds a tangent screw 50, with transverse axis, the control of which may be effected at one end or the other by means of hexagonal nuts such as 51. For the sake of simplicity and for better understanding of the drawings, the usual electric equipment has not been shown for cutting off the power supply to the electromagnet after tripping, for signalling tripping and for transferring the tripping current to the next tripping means after opening of the hooks.

For a good understanding of the operation of the mechanism, in FIG. 3, the same parts as those of FIG. 2 have been shown but in the position corresponding to the open hooks.

Operation of electromagnet 44 causes lever 40 to rotate in the direction of the arrow of FIG. 3 against spring 42. Roller 39 urged by spring 35 escapes, holds the lever 40 in the tripping position and causes the simultaneous rotation of the two cams 32 and 32' in the direction of the arrows and against spring 33; rollers 31 and 31' also escape while maintaining cams 32 and 32' in the tripped position and allowing the swivel joints 28, 29 and 28', 29' to break under the action of the load which the hooks support, which hooks open by pivoting about pins 21 and 21'.

A load is fastened on in the opposite way, but it will be understood that it is previously necessary to reset spring 35 by acting manually on the hexagonal nut 34' so as to bring roller 39 into the position which it occupies in FIG. 2, which allows lever 40 to assume also the position it occupies in FIG. 2 under the action of spring 42. As was mentioned above, hooks 20 and 20' will be brought to the low position by extension of the tensioner 24, obtained by manual operation of the hexagonal nut 25 so as to facilitate fastening on of the load. The load is then presented so that its rings 4 and 4' are situated directly below hooks 20 and 20' either simultaneously, or successively. With the load raised, the upper part of ring 4 (or 4') acts on the counter nose 20a of the corresponding hook 20 and brings it into the closed position. If required, action on the screwdriver slit of pivots 30 ensures this closure by alignment of the swivel joint 28-29. Cam 32 under the action of spring 33 then assumes the locking position shown in FIG. 2. Engagement of ring 4', if it was not effected simultaneously, takes place similarly in a second operation. Introduction of a safety pin in hole 46 verifies the correct positioning of the parts. Final fixing of the load on supports 14 and 14' as well as the prestress of the assembly are effected by retraction of the tensioner 24 obtained by manual action on the hexagonal nuts 25.

Heavy loads exist comprising engagement rings with a between axis distance of 30 inches or 762 mm. So as to be able to carry either relatively light loads with rings having a between axis distance of 14 inches or 355.6 mm, or heavy loads with rings having a between axis distance of 30 inches (762 mm) without overloading the mechanism described above, an extension of the device is provided, as shown in FIG. 4, comprising a complementary step down swivel joint 30 inches (762 mm) hook.

Figure 4:
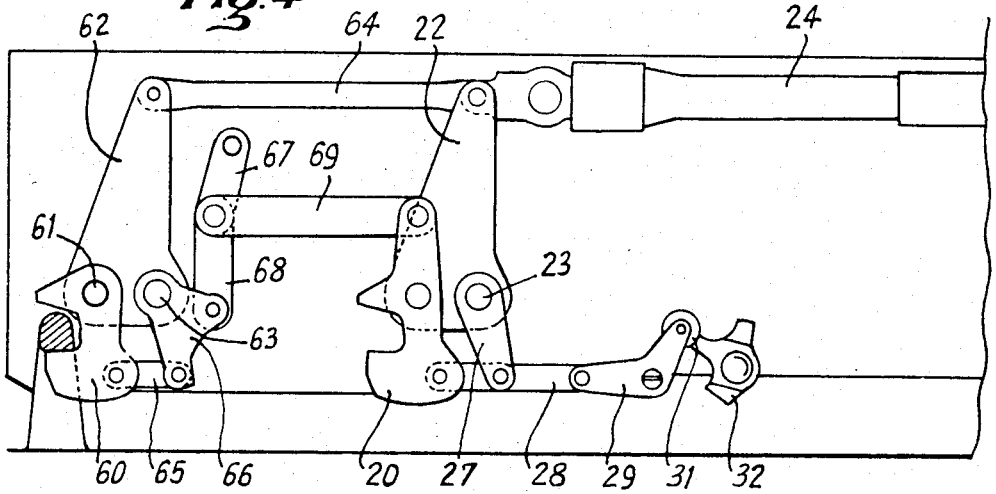
FIG. 4 shows a possible extension of the device for carrying heavy loads, comprising rings with a between axis spacing of 30 inches or 762 mm.
Figure 5:
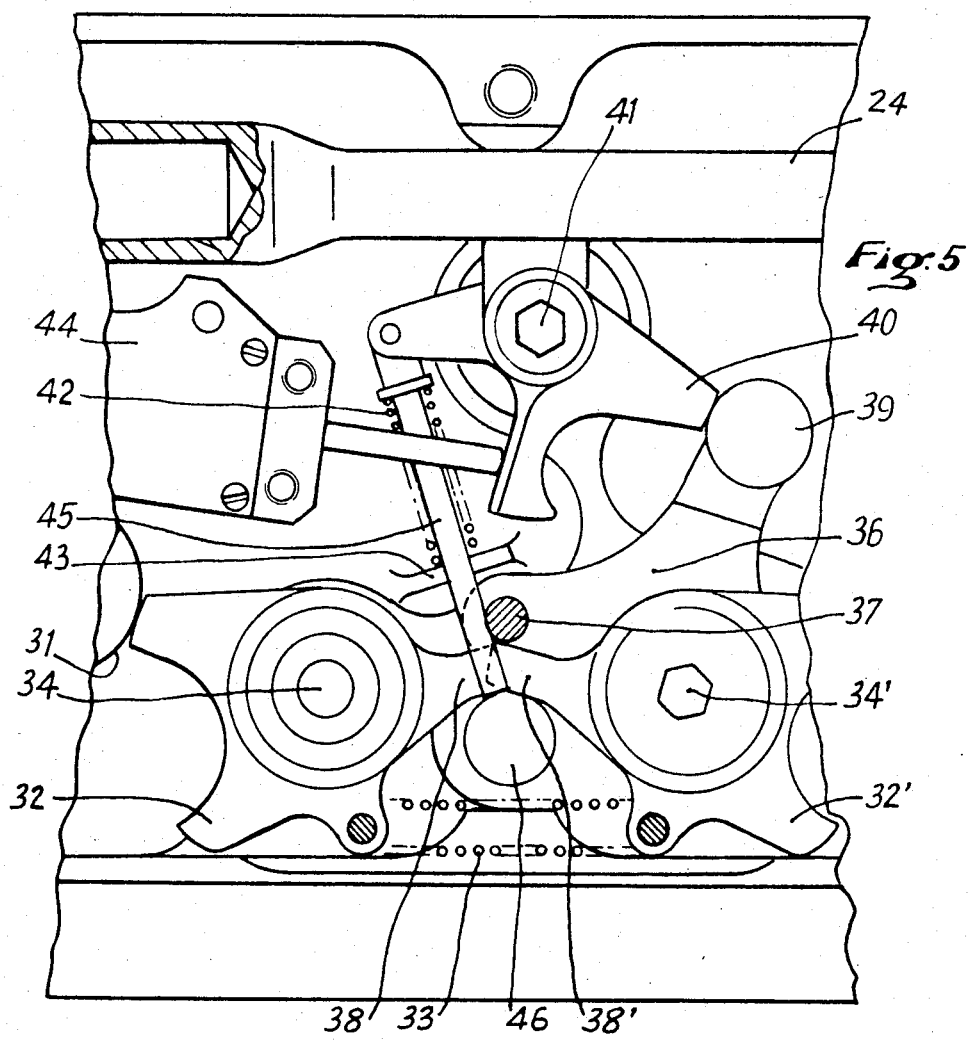
FIG. 5 shows the central part of the tripping device of FIG. 2, greatly enlarged for showing the mechanisms.

In this FIG. 4, only the step down relating to the left hand hook has been shown and it will be readily understood that an identical step down is provided for the right hand hook. At 60 has been shown the 30 inch hook pivoting at 61 on the bracket 62 which pivots on pin 63. This bracket 62 is connected by a link 64 to bracket 22, already provided for the 14 inch hook. Hook 60 is connected by a link 65 to a lever 66 also pivoting at 63. At 67 and 68 have been shown the two elements of a swivel joint connected by a link 69 to the 14 inch hook 20.

It can be readily seen that the device for raising hooks 20 acts simultaneously on the raising of hooks 60 as was already described in French Pat. No. 77.39818 of the same firm but the force exerted on hook 60 is stepped down so that the tripping mechanism provided for the lightest loads remains valid.

What we claim is:

1. A device for carrying and fixing loads under aircraft, which comprises:
    two pivoted independent hooks, each adapted to be engaged by a suspension ring of the load,
    bearing means disposed in the vicinity of each hook,
    means for raising said hooks in order to apply the load suspended to the hooks against said bearing means,
    a cam tripping mechanism for controlling and locking each of the two hooks, which comprise associated with each hook a linkage connected to the hook and terminated by a pivoting lever bearing a roller adapted to co-act with rotating cam means, and a pivoting lever associated with a tripping spring and adapted in a released position of the tripping spring to engage said rotating cam means for the escapement of the rollers and the opening of the hooks, said pivoting lever bearing a supplementary roller adapted to engage a pivoting stop for compressing said tripping spring,
    and a control electromagnet acting on said pivoting stop to rotate same from its position compressing said tripping spring to the position releasing this spring.

2. A device according to claim 1, wherein a force step down mechanism consisting of a single swivel joint is associated with each hook, the parts relating to each of the two hooks being identical.

3. A device according to claim 1 wherein a safety pin is introduced in a hole provided for this purpose to ensure a correct positioning of the rotating cam means associated with the hooks and of the pivoting stop retaining the tripping spring and to hold the control electromagnet in a retracted position, even if this latter is accidently switched on.

4. A device according to claim 1, which comprises at one end a vertical pivot axis and at the other end an eccentric also with vertical axis, the control of which is provided by a wheel and a transverse tangent screw accessible from the sides of the device for ensuring control of an orientation of the load.

5. A device according to claim 1, wherein an intermediate base plate is fixed to the aircraft and comprises, besides fixing points for the carrying device, a further bore corresponding to a vertical pivot axis of the carrying device and an oblong hole corresponding to the eccentric which allows orientation thereof.

6. A device according to claim 1, wherein all the manual controls:
azimuth harmonization,
resetting of the trip device,
engagement of the hooks,
raising of the hooks for fixing the load,
manual tripping,
introduction of the safety pin,
can take place from one side or the other of the device.

7. A device according to claim 1 wherein, for carrying heavy loads with rings having a between axis distance of 30 inches, an additional force step down is provided at right angles to each of the 30 inch hooks, so as not to overload the cam tripping mechanism provided normally for lighter loads comprising rings with a between axis distance of 14 inches.

8. A device according to claim 7, wherein the additional force step down acts through a crank lever whose fixed pin is the same as that of a bracket for raising a 30 inch hook.

* * * * *